United States Patent [19]
Wolff

[11] 3,823,600
[45] July 16, 1974

[54] PNEUMATIC LINEAR ACCELERATOR
[75] Inventor: Walter M. Wolff, Enon, Ohio
[73] Assignee: The United States of America as represented by the Secretary of the United States Air Force, Washington, D.C.
[22] Filed: Apr. 9, 1973
[21] Appl. No.: 349,901

[52] U.S. Cl. ............................... 73/12, 91/25
[51] Int. Cl. .............................................. G01n 3/30
[58] Field of Search............................ 73/12; 91/25

[56] References Cited
UNITED STATES PATENTS
2,925,803  2/1960  Ottestad........................... 73/12 UX

*Primary Examiner*—James J. Gill
*Attorney, Agent, or Firm*—Harry A. Herbert, Jr.; Arthur R. Parker

[57] ABSTRACT

A pneumatically-operated, linear accelerator including a control chamber having an open end; one or more load chambers surrounding the control chamber; and a drive chamber having an end wall with an inner opening in communication with the control and load chambers, a drive piston on one side of and blocking the inner opening and incorporating a metering pin extending through the opening, and a push rod in contact with the drive piston and extending through an outer end opening in an opposite end wall of the drive cylinder for integral attachment to a test vehicle. A hollow control piston, mounted in overlapping relation in the control chamber and encompassing the projecting metering pin, incorporates an orifice end that extends to, and is held in sealed relation against the drive cylinder-communicating inner opening by the introduction of compressed air, at equal pressure, into both the control and load chambers. The accelerator is fired, and the drive piston, push rod and attached test vehicle accelerated to the test velocity by the activation of a fast acting valve to relieve the pressure in the control chamber and thus enable the compressed air in the load chambers to move the control piston away from its sealed position and thereby enter the communicating inner opening for action directly against the drive piston.

9 Claims, 3 Drawing Figures

PATENTED JUL 16 1974 3,823,600
SHEET 1 OF 3

PNEUMATIC LINEAR ACCELERATOR

BACKGROUND OF THE INVENTION

This invention relates to the use of the pneumatic linear accelerator to simulate the various impact loads naturally occurring to a variety of vehicles, equipment and other structures, and personnel involved in accidents and other catastrophic events.

For many years, considerable impact testing and research has been, and is continuing to be conducted by various governmental and industrial facilities. In this connection, some areas of concern include the investigation of structural dynamics and the integrity of both military and civilian vehicles and aircraft, the mechanical shock response of munitions and explosives, and the biological effects of impact on, and the protection of human operators and passengers. Examples of such impacts would include, but are not to be limited to, the impact effect of falling aircraft, or parachuting personnel, particularly where the parachute fails or partially fails, against the ground, or where, in ejecting from a disabled aircraft, the pilot or other air crew strikes against, or is struck by, a portion of the ejection apparatus or some other aircraft structure.

The type of pneumatic linear accelerator being presently utilized in much of the impact testing and research facilities consists of the well-known "Hyge" machines, fabricated by the Rochester Division of the Consolidated Electrodynamics Corporation. This machine, to be further described in detail, consists basically in two communicating chambers, in one of which a "set" pressure is established by the use of compressed nitrogen gas. The other chamber is charged with compressed air at the "load" pressure, which, when it is desired to fire the device, is increased to thereby act against, and lift a face seal mounted on a drive piston slidably positioned in the set pressure-chamber with the said face seal in sealing position against a communicating orifice between the two chambers. The aforementioned lifting of this face seal by the increase in the load pressure in one chamber acting against the set pressure in the other chamber exposes the entire piston area to the full pressure. As a result, the high force thereof immediately accelerates the piston, a piston rod attached thereto and a test vehicle in contact with the piston rod to the required test velocity. Basically, the foregoing arrangement of the Hyge machine requires a total of three "dynamic" seals for its effective and safe operation; namely, the already-mentioned face seal mounted on the end of the rapidly moving drive piston, and, in addition, a second dynamic seal between the piston and set pressure-chamber and, a third dynamic seal between the piston rod and set pressure-chamber. Since the internal parts of this device are stopped by compressing the nitrogen gas in the set pressure-chamber, due to the kinetic energy thereof and the acting load pressure, the cushioning pressure being created may be on the order of 10,000 psi and at a temperature of 1,000° F. This puts a severe stress on the piston and piston rod seals. To further improve on this arrangement, the novel pneumatic linear accelerator of the present invention was developed whereby the dynamic seals of the foregoing apparatus have been eliminated and a special control piston utilized in a novel manner to be hereinafter disclosed in the following summary and detailed description.

SUMMARY OF THE INVENTION

The present invention consists briefly in a new and improved pneumatic linear accelerator that includes a centrally-disposed, control cylinder incorporating a control chamber, and having an open end and a hollow control piston mounted in overlapping relation therein with an orifice end portion extending outside of the open end of the control cylinder; one or more load cylinders concentrically-arranged around and outwardly of the circumference of the control cylinder; and a drive cylinder formed on one side of the control cylinder with an end wall incorporating an opening or orifice communicating with the control and load chambers, a drive piston slidably mounted in the drive cylinder and normally positioned against, and on one side of the communicating orifice, and a push rod contacting the drive piston and extending outside the drive cylinder for integral attachment to a test vehicle.

The drive piston incorporates a metering pin that extends through the communicating opening into the interior of the hollow control piston and is automatically operative to control the subsequent discharge of compressed air in the load chambers, through the said communicating opening to drive the drive piston, when the accelerator is fired. To prepare for its firing, compressed air is introduced, from a common high pressure air supply, at equal pressure, into both the control, and load chambers. This forces the control piston and a face seal formed on its orifice end into a sealed relation against one side of the communicating opening.

To thereafter fire the present accelerator and thus accelerate the test vehicle to the desired velocity, a fast acting valve, in communication with the interior of the control chamber, and uniquely providing a controlled relief of the pressure therein, is activated to thereby reduce the pressure in the control chamber and thus allow the now-higher pressure in the load chambers to automatically reposition the control piston and its attached face seal out of sealing contact with the communicating orifice with the drive chamber. This allows the compressed air in the load chambers to act against the full face of the drive piston and thus drive it, the push rod and attached test vehicle to the design test velocity.

Inherent objects, advantages and other features of this invention will become readily apparent hereinafter in the following disclosure, taken in connection with the accompanying drawings, in which:

DESCRIPTION OF THE PREFERRED EMBODIMENT

Figure 2:
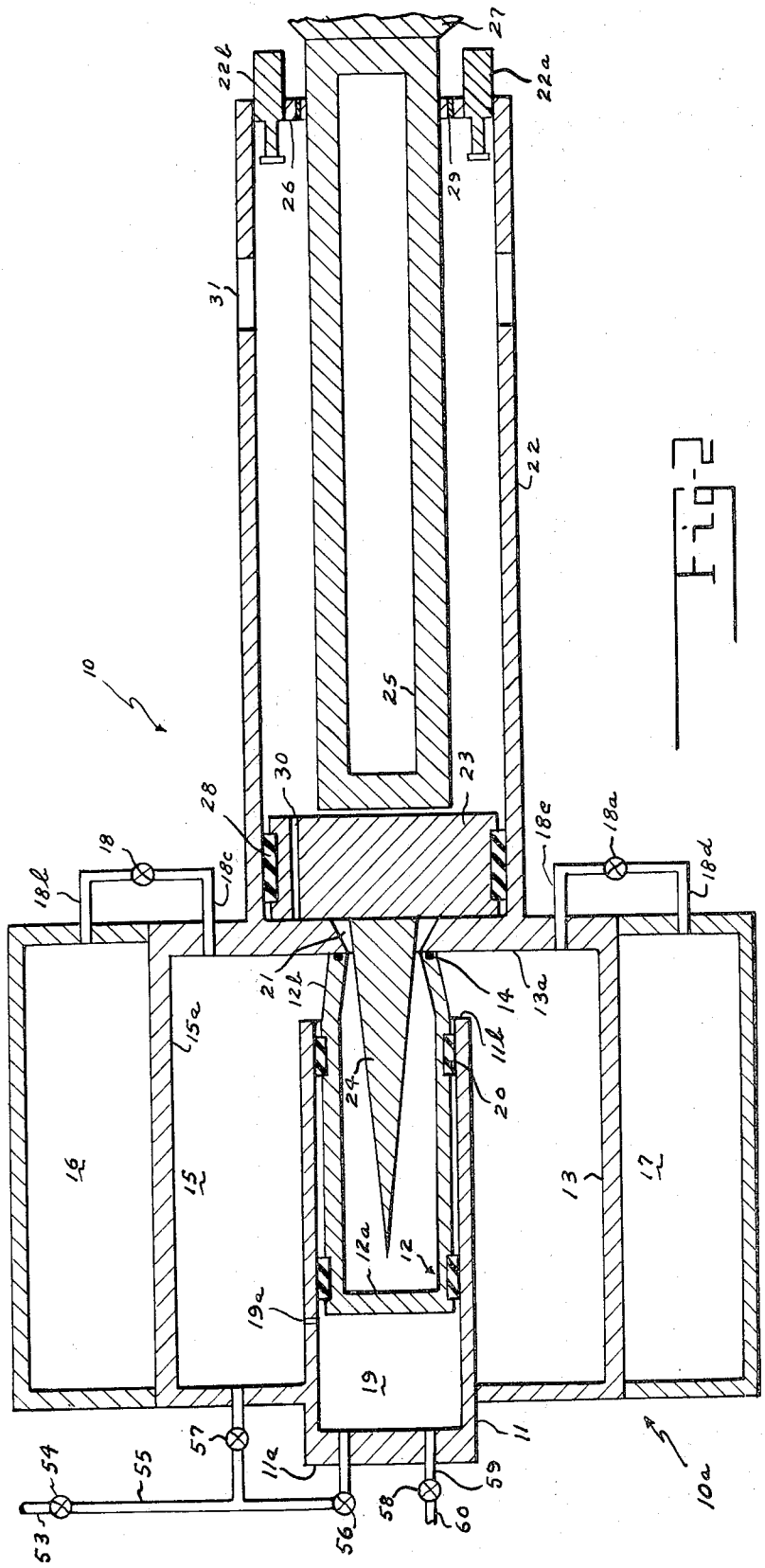
FIG. 2 is a second longitudinal sectional view, depicting details of the new and improved pneumatic linear accelerator of the present invention.

Referring generally to the drawings and, in particular, to FIG. 2 thereof, the new and improved pneumatic linear accelerator of the present invention is indicated generally at 10 as including principally a main enlarged housing 10a that incorporates the unique load pressure-producing means of the invention to be further described, and a drive cylinder 22 mounted on the front or forward side of the said housing 10a that incorporates the drive means in direct contact with the test vehicle to be accelerated. The said load pressure-producing means is enclosed within the main housing 10a and includes, in part, a first, centrally-disposed control cylinder 11 forming a control chamber 19 and having an outwardly projecting closed rear end 11a and an open front end 11b. Immediately surrounding and disposed in substantially concentric relation to, and enclosing said control cylinder 11 is a main or first, load pressure-chamber or section 15 that is generally defined by the outer walls of the main housing 10a and the outer cylinder 13, and which further includes a forward or front wall, at 13a, that is actually common to both the housing 10a and the drive cylinder 22, and is further disposed forwardly of, and thereby in spaced relation from the open front end 11b of the control cylinder 11. In this manner, a communicating passageway is formed between the aforesaid main or first, load pressure-chamber or section 15 and the interior of the drive cylinder 22 by way of a communicating opening or orifice 21 formed therebetween in the said common wall 13a. If desired and depending on the load requirements for a particular test program, additional, secondary or auxiliary, outer load pressure-chambers or sections may be utilized within the scope of the present invention and mounted on, and further outwardly of the main or first, load pressure-chamber or section 15, such as is, for example, indicated respectively at the reference numerals at 16 and 17. In this regard, these other load pressure-chambers or sections, as at 16 and 17, may communicate with the main, load pressure-chamber or section 15 through, and be separated by manually-operated, shut-off valves, such as is indicated at 18 and 18a, respectively, and their associated and communicating compressed air passage lines at 18b and 18c, and 18d and 18e.

Slidably positioned in overlapping relation in the open front end 11b of the control chamber 19 is a unique, cylindrically-shaped, hollow control piston 12 having a closed inner or rear end 12a defining the forward end or side of the control chamber 19, and, in accordance with the novel teachings of the present invention, an inwardly tapered, open outer or front orifice end portion 12b that extends or projects out of the control cylinder 11 to an abutting and sealed relation directly against the aforementioned communicating orifice 21 in the common wall 13a separating the housing 10a from the drive cylinder 22. Said control piston 12, which, because of its inwardly tapered front orifice end portion 12b incorporates a larger diameter at its control cylinder side, mounts a static face seal 14 on the said orifice end portion 12b, which face seal 14 provides the necessary sealing of the communicating orifice 21 until the present accelerator is fired in the manner to be hereinafter described in detail. Moreover, control piston 12 fits the walls of the said control cylinder 11 with a close tolerance, and, to reduce wear and friction therebetween, polytetrafluoroethylene, bearings built into the outer circumference of the said control piston 12, as indicated at 20, for example, are used. When the control piston 12 is operated to its unsealed position, or to the left, as will be described in detail hereinafter, a mechanical shock absorber, such as is schematically illustrated at 63c in the inventive form of FIG. 3, to be subsequently described herein, may be installed on the inside of the control cylinder cover; i.e., the closed rear end 63b thereof, to thereby prevent a heavy impact between the piston 12 and the said control cylinder-cover or rear end 63b. It is noted that, again in accordance with the unique teachings of the present invention, no dynamic seal is required between the control piston 12 and the cylinder 11 and any leakage from the control chamber 19 is uniquely controlled through a controlled leakage path formed by the relatively narrow passage or orifice 19a disposed between the control chamber 19 and the first, outer load-pressure chamber or section 15.

Mounted within the aforementioned drive cylinder 22 is a slidably positioned, drive piston 23 that incorporates on one side thereof an integral and relatively elongated, metering pin 24 that extends through the communicating orifice 21 into the interior of the hollow control piston 12 and which may be contoured, as desired and in a well-known manner, in the event of a desired shaping of the accelerator pulse. Moreover, the length of the said metering pin 24 governs the actual length of the control cylinder 11 and control piston 12. In contact with, but not attached to, the drive piston 23 is the inner end of an elongated push rod 25 (FIG. 1) that is also slidably positioned in the drive cylinder 22 and extends, at its outer end, through the outer end of the said drive cylinder 22, by way of an outer end flange element, at 26, for its integral attachment to a test vehicle, indicated generally and in a very fragmentary and broken-away form at the reference numeral 27. The drive piston 23 may be made of any suitable lightweight material and, as in the case of the control piston 12, fits in the drive cylinder 22 with a close tolerance. Again, no dynamic seal is required between the drive piston 23 and the drive cylinder 22 but, instead, a polytetrafluoroethylene bearing may be used, as at 28, between the drive piston 23 and cylinder 22 to reduce friction and wear. Likewise, a polytetrafluoroethylene liner 29 is used between the push rod 25 and end flange element 26 in place of the usual dynamic seal. Furthermore, a leakage path across the drive piston 23, created and controlled by the relatively narrow passage or orifice, at 30, prevents, in a novel and yet simplified manner, the build-up of excessive pressure behind the drive piston 23, in the event that the static face seal 14, uniquely mounted in the tapered orifice end portion 12b of the control piston 12 and providing, as previously-noted, its seal against the communicating orifice 21, should leak.

The drive cylinder 22 is further equipped with air vents, as at 31, which specifically provide for a fast pressure relief before the moving drive piston 23 engages against and is stopped by means of energy absorbers, as at 22a and 22b, formed in the outer end of the said drive cylinder 22. The end flange element 26 has a sufficient clearance from the push rod 25 to prevent any mechanical contact therebetween, and the said push rod 25 may be rigidly built for an adequate high ringing frequency in the longitudinal axis. It is preferably connected to the test vehicle 27 to reduce the weight of the internal moving masses, when this arrangement is found feasible, after taking into consideration the characteristics and payload of the particular test vehicle, as well as the practicality of the actual length of the cantilevered attachment to the test vehicle. In either event, it is noted that the present invention is concerned principally with a unique control piston, as at 12, that forms a new and novel pneumatic accelerator that exercises better and more accurate control over the acceleration pulse being generated and, in addition, eliminates the dynamic seals required in the presently-used accelerator of FIG. 1, for example.

Figure 1:
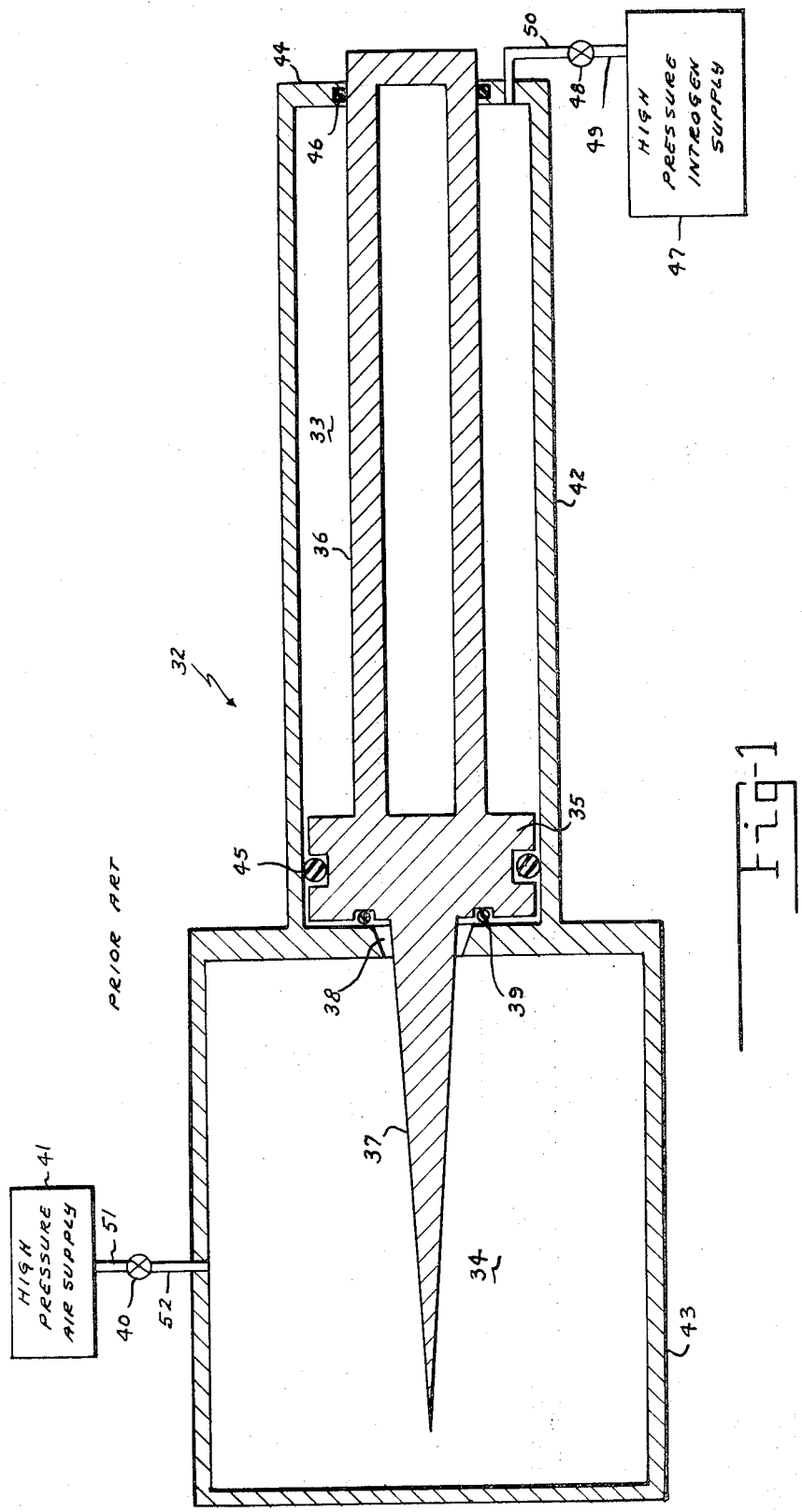
FIG. 1 is a longitudinal sectional view, illustrating details of the prior art pneumatic linear accelerator in general use in impact testing and research facilities.

As is seen particularly in the aforementioned FIG. 1, a prior art device known as the Hyge machine is indicated generally at 32 as consisting mainly of two interconnected or integrally formed cylinders, at 42 and 43, which respectively form a first, set pressure-chamber 33 and a second, load pressure-chamber 34 with a communicating opening or orifice 38 therebetween. A combined drive piston 35 and piston rod 36 are slidably positioned in the cylinder 42, with the outer end of the piston rod 36 extending through the outer end portion 44 of the cylinder 42 for contact with the test vehicle to be accelerated. The side of the said drive piston 35 opposite from the piston rod 36 incorporates an integral and elongated, metering pin 37 that extends through the opening into the interior of the load pressure-chamber 34. The face of the piston 35 is sealed to the orifice 38 by means of a dynamic face seal 39, and the piston 35 and piston rod 36 are sealed to the cylinder 42 by the dynamic seals, indicated at 45 and 46, respectively.

With the system of FIG. 1, the first, set pressure-chamber 33 is initially charged at a set pressure with compressed nitrogen gas, from a high pressure nitrogen supply 47 through, a fill valve 48 and associated compressed gas lines at 49 and 50. Nitrogen gas is used to prevent dieselizing due to any traces of hydrocarbons that may have entered the set pressure-chamber 33. This charging of the set pressure-chamber 33 seals the face seal 39 on the piston 35 against the orifice 38. Shortly before a test run, the second, load pressure-chamber 34 is charged with compressed air, from a high pressure air supply 41 through a fill valve 40 and associated compressed air lines or hoses at 51 and 52. In this connection, it is noted that this system is in equilibrium with the forces on both sides of the drive piston being normally equal when the ratio between the load pressure and the set pressure is approximately 5 to 1. To fire the device, either the load pressure must be increased, or the set pressure decreased. Generally, the load pressure is increased, at which time, the face seal 39 is lifted from the orifice 38 by the load pressure in the chamber 34, thereby exposing the entire area of the drive piston 35 to the full pressure.

The high force created by foregoing action acts instantaneously to accelerate the internal parts; namely, the piston 35 and attached metering pin 37, and piston rod 36, as well as a test vehicle placed directly in front of, and in contact with the exposed end of the piston rod 36. After achieving its maximum velocity, the test vehicle would separate from the piston rod 36 and be stopped along guidance rails provided therefor. The piston 35 with, of course, its metering pin 37, and the piston rod 36 are stopped, as noted hereinbefore, by compressing the nitrogen gas at the right side of the piston 35. Again, as previously explained, the kinetic energy and the acting load pressure may easily cause the cushioning pressure to reach a pressure of 10,000 psi and a temperature of 1,000°F, resulting in a severe stress being placed on both the piston seal 45 and the piston rod seal 46, tending to cause leaks therein.

Leaks in any of the three seals, at 39, 45 and 46, of the FIG. 1 device may cause a misfire. Also, stopping of the internal parts within a short distance generates very high shock loads on the mounting means for this apparatus. Nitrogen gas must be used to prevent dieselizing, as noted before and, finally, an extremely accurate and thus expensive machine work is necessary for both surface finishing of the interior walls of the set pressure-chamber 33 and to achieve the correct alignment of the piston 35 and piston rod 36, with respect to the interior of the cylinder 42.

The unique pneumatic linear actuator of the present invention, as illustrated in FIG. 2, on the other hand, constitutes an improvement by its elimination of the need for any dynamic seals and, in particular, by its novel use of the control piston 12 in specific connection with the positive control of leakage in the inventative system. Thus, to operate the inventive device of FIG. 2, it is only necessary to move the test vehicle, as at 27, to the left until the drive piston 23 in indirect contact therewith, through the push rod 25, has been placed in contact against the housing wall 13a and communicating orifice 21 between the cylinders 11 and 22. After determining the required air volume and air pressure needed in the first, outer load chamber 15, one or more of the additional secondary or auxiliary load pressure-chambers or sections, as at 16 and 17, would be connected as required to, or placed in communication with the first load pressure-chamber or section 15, by opening the appropriate shut-off valves, as at 18 and 18a. Then, from a common high pressure air supply, compressed air being fed from a main compressed air-feed line at 53, by opening the main, shut-off valve 54, through another feed line 55, would be first utilized to initially charge the control chamber 19, through its own separate fill valve 56, to thereby push the control piston 12 to the right to seal the face seal 14 carried in its orifice end portion 12b against the communicating orifice 21, thereby blocking the communicating passageway with the load pressure-chamber or section 15. Immediately thereafter, the said first, outer, load pressure-chamber 15 would be charged from the same source and at equal pressure by the opening of its fill valve at 57. Of course, if additional load chambers, as at 16 and 17, are being utilized, then the opening of the previously-noted, interconnecting shut-off valves, as at 18 and 18a, would also pressurize these chambers at the same pressure of compressed air being admitted into both control, and load-pressure chambers 19 and 15.

During either the actual charging of the aforementioned control and load-pressure chambers, as at 19, 15 and 17, or after charging has been completed and/or during the operation of the inventive accelerator 10, in case of any leakage at either the face seal 14, or at any valve in the inventive system, the leakage path uniquely and simply provided at the controlled leakage orifice 19a, as taught by the present invention, will maintain equal pressure between the control and outer load-pressure chambers, as at 19, and 15, 16 and 17. Therefore, no misfiring of the present accelerator can occur.

When the inventive accelerator of FIG. 2 is ready for firing, another unique feature of the present invention; namely, a fast acting valve, at 58, is activated to thereby positively provide a definitely controlled relief of the pressure in control chamber 19 to the atmosphere, through the communicating compressed airlines at 59 and 60. At this time, the now-higher load pressure of the compressed air in the load-pressure chamber, as at 15, simultaneously acts against the right side of, and automatically pushes the control piston 12 to the left, thereby breaking its sealed relation with the communication orifice 21 and thus allowing the said load pressure to act on, and rapidly accelerate the drive piston 23 and the test vehicle-attached push rod 25 to the right. As stated hereinbefore, the test vehicle will automatically separate from the piston 23, when maximum velocity has been achieved. Of course, also as noted before, during the movement of the piston 23 to the right, a fast pressure relief is specifically and positively provided by the air vents, as at 31, in the drive cylinder 22, which actually relieve the working pressure when the piston has passed the said vents. The piston is thereafter stopped by the energy absorbers 22a and 22b. Thus, with the inventive system, the said energy absorbers 22a, 22b are required to stop or absorb only the kinetic energy of the moving piston 23 and metering pin 24.

Figure 3:
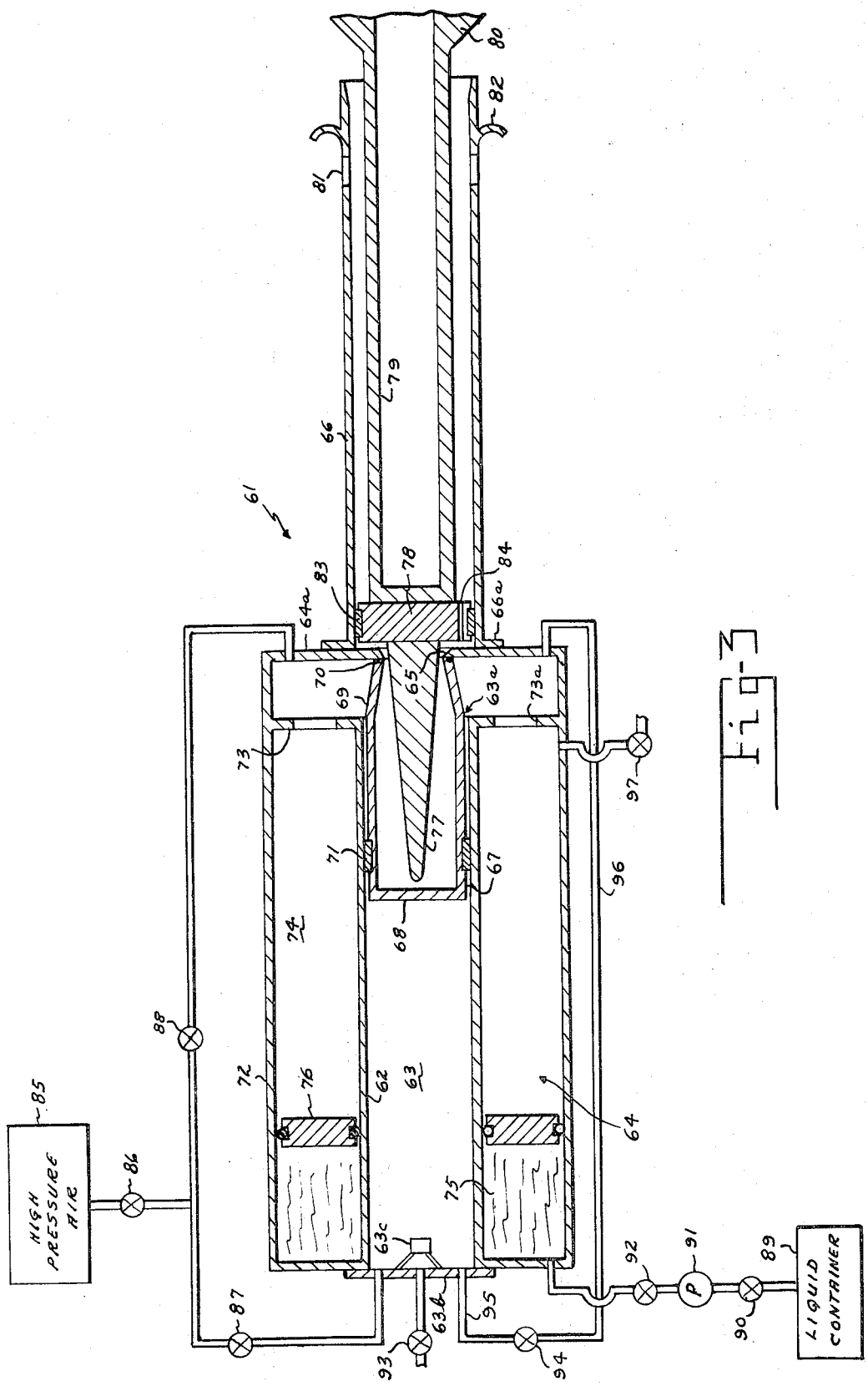
FIG. 3 is a third longitudinal sectional view, showing details of a modified form of the new and improved pneumatic linear accelerator of FIG. 2.

With particular reference to FIG. 3, a modified form of the invention of FIG. 2 that operates on the same basic principle, but which changes the air volume being used at the load pressure by means of a floating piston arrangement to separate air and liquid, is indicated generally at 61, again, as partially including a central control cylinder 62 forming a central control chamber 63 having an open forward end at 63a and a closed rear end at 63b. An outer, load pressure-chamber or section 64 is disposed in concentric relation around said control chamber 63 and, again as in FIG. 2, incorporates a forward wall at 64a that is disposed forward of, and in spaced relation to the open forward end 63a of the control chamber 63 to thereby provide a communicating passageway with the outer, load pressure-chamber or section 64. To complete the communication of this passageway with the interior of a drive cylinder 66 mounted on the said wall 64a, a communicating opening or orifice 65 is formed in the wall 64a, as shown.

Slidably mounted in overlapping relation within the control chamber 63 is a hollow control piston 67, again, incorporating a closed rear end at 68 defining one side of the said control chamber, and an inwardly tapered, orifice end 69, projecting to a sealed relation against the communicating orifice 65 in the wall 64a. As in the FIG. 2 device, a static face seal, indicated at 70 as being mounted in the control piston-orifice end 69, is used for accomplishing the requisite sealing of the control piston 67 to the said orifice 65, and, in addition, the said control piston 67 requires no dynamic seal between it and the control cylinder 62. It also uses a polytetrafluoroethylene bearing 71 to reduce friction and wear with the cylinder 62.

Extending through the communicating orifice 65 and into the hollow interior of the control piston 67 is the metering pin 77 integrally formed on one side of a drive piston 78 slidably mounted in the drive cylinder 66. On the other side of the drive piston 78 is an elongated push rod 79 that, unlike the separate push rod 25 of FIG. 2, is shown integrally formed on the drive piston 78 and it is also affixed to the test vehicle, indicated in schematic and broken-away form at 80. The drive piston 78 and integral metering pin 77 have been depicted as being rigidly connected to the push rod 79 that is, in turn, affixed to the test vehicle 80, for the particular situation where the drive cylinder 66 does not have adequate space to install energy absorbers therein, as at 22a and 22b in FIG. 2. Again, no dynamic seal is used between the drive piston 78 and the drive cylinder 66. Of course, with the test vehicle 80 being held in a correct alignment on its own guidance rails, the push rod 79 rigidly attached thereto is similarly retained in a correctly aligned relation with respect to the drive cylinder 66, during its rapid movement therein. Also, the drive cylinder 66 incorporates air vents, as at 81, used for the same purpose as those at 31 in FIG. 2, and, in addition, a splash shield, at 82, is utilized. Finally, the drive piston 78 mounts a polytetrafluoroethylene bearing, at 83, for reducing friction and wear, and further uniquely incorporates a controlled leakage path formed by the elongated and narrow passage or orifice 84 extending through the said drive piston and automatically acting to prevent pressure build-up behind said piston, should the face seal 70 leak, by providing for a positive and controlled leakage of air therethrough.

The aforementioned outer, load pressure-chamber or section 64 is enclosed with an outer load pressure-cylinder 72 which includes rigid support means, at 73, for the control cylinder 62 that, also, incorporates a compressed air-outlet opening, at 73a, through which the load pressure is applied during the firing of the accelerator of FIG. 3 to drive a test vehicle, as at 80, in a manner to be hereinafter further described. The load pressure-chamber 64 is uniquely separated into separate compressed air-and liquid, load pressure-chamber portions, indicated respectively at 74 and 75, by means of a novel floating piston 76. To prepare the modified accelerator 61 for firing, initially, the test vehicle, as at 80, would be moved to the left, along with the internal moving parts (push rod 79, piston 78 and metering pin 77) attached thereto, until the drive piston 78 is positioned in flush relation against the communicating orifice 65. Then, the control chamber 63 is charged or filled with compressed air from a high pressure air supply 85, through the manual opening of a main shut-off valve 86 and a control chamber-fill valve 87 and their associated compressed air-feed lines, as is cleary illustrated. This action positively moves and seals the control piston 67 and its face seal 70 against the communicating orifice 65. Next, the load pressure-chamber portion 74 is charged or filled with compressed air, at equal pressure, from the same high pressure air supply 85, through its manually-opened fill valve 88 and associated compressed air-feed lines, into the front end thereof by way of the end outlet-opening or orifice 73a.

In the arrangement of FIG. 2, the air volume to be used to create the required load pressure in the load pressure-chamber 15 thereof (FIG. 2) is varied by the use of one or more additional load pressure-chambers or sections, as at 16 and 17; in the inventive form of FIG. 3, the liquid, load pressure-chamber portion 75, disposed to the rear of, and separated by a floating piston 76 from the compressed air, load pressure-chamber portion 74, is utilized for this purpose. Thus, to vary the volume of compressed air contained within the load pressure-chamber portion 74 to that precomputed for a particular load requirement, the load pressure-chamber portion 75 is pressurized with a predetermined and metered amount of liquid from a main liquid supply, at 89, through a manually-opened, shut-off valve 90, the action of an appropriate pump 91, a fill valve 92 and suitable fluid lines interconnected therebetween, as shown. With this novel system, the floating piston 76 would be naturally positioned at a particular location within the cylinder 72 that is consistent with an equilibrium state between the pressures of the compressed air and liquid respectively introduced into the load pressure-chamber portions 74 and 75. Naturally, the volume of the compressed air contained in the load pressure-chamber portion 74 could be charged, within limits, by either admitting less or more compressed air in the chamber 74 or, alternatively, by controlling the pressurized liquid being admitted into the load chamber 75 to a greater or lesser amount. Of course, the novel floating piston 76 specifically and positively provides a rather easy accommodation to the different pressures of the compressed air and liquid by automatically and naturally assuming the previously-noted equilibrium position.

To fire the accelerator of FIG. 3, again a fast acting valve 93 may be activated to relieve the pressure in the control chamber 63 and thus allow the compressed air in the load pressure-chamber portion 74 to unseal the control piston 67 and its face seal 70, by pushing it to the left and thus exposing the full face of the drive piston 78 to the load pressure being created thereby. Again, as was stated in connection with FIG. 2, a mechanical shock absorber, as at 63c, may be installed on the inside of the cylinder-rear end 63b to absorb any heavy impact between the control piston 67 and the said cylinder-rear end. The aforementioned load pressure is thereafter effective to rapidly accelerate the drive piston 78 and attached push rod 79 and test vehicle 80 to the design velocity intended therefor. Since all internal working parts; namely, piston 78, metering pin 77 and push rod 79 are all ejected from the drive cylinder 66 during a test run, no internal masses have to be decelerated within the inventive device.

Instead of using the controlled leakage path, as at 19a in FIG. 2, the controlled leakage between the control chamber 63 of the inventive form of FIG. 3 and the load pressure-chamber 64 is effected by the operation of a leakage control valve 94 that, for this purpose, incorporates communicating compressed air-lines, respectively indicated at 95 and 96, the latter constituting a by-pass line, and extending between the control chamber 63 and, in effect, the load pressure-chamber portion 74. Furthermore, a drain valve, indicated at 97, may be installed at the lowest point of the load pressure-chamber 74 to check for fluid leakage. Note that a small fluid leakage, however, would not affect the operation of the present accelerator.

Thus, a new and improved pneumatic linear accelerator has been developed by the present invention whereby the dynamic seals of a currently-used accelerator machine have been eliminated and a unique controlled leakage feature substituted therefor that provides a fail safe operation making this invention particularly adapted for use with human test subjects. Moreover, the disadvantageous use of nitrogen gas to establish a set pressure, as noted in the prior art, has likewise now been eliminated by the present accelerator which also has the further built-in advantage of enabling the easy adjustment thereof to the exact amount or volume of compressed air needed for a particular load requirement.

The present invention also offers advantage by reducing or eliminating the internal masses needed to be stopped during the operation of similar accelerator machines and, in addition, the requirements of different test impact programs can be rather easily accommodated in the present apparatus merely by varying the diameter of the drive piston through the installation of another drive cylinder. Furthermore, the length of the drive cylinder per se may be changed by the simple adding or taking away of sections. Finally, because of the relatively simple design of the present pneumatic linear accelerator, its manufacture can be made at a relatively reduced cost, because the machine shop work required in critical areas, such as that between the drive piston and its cylinder, can have relatively high tolerances.

I claim:

1. A pneumatic linear accelerator for generating various acceleration pulses by the controlled release of stored pneumatic energy, comprising; a control chamber having a closed rear end and an open front end; a hollow control piston slidably positioned for selective adjustment in said control chamber between forward and rear locations therein, and having a closed rear end nearest the closed rear end of said control chamber and an open front end defining an orifice and projecting in overlapping relation from and further forwardly of the open front end of the control chamber when said control piston is adjusted to its forward location; a main, load-pressure chamber disposed in surrounding relation to said control chamber, and incorporating a chamber wall oriented in spaced relation to and forwardly of, and having an orifice centrally-disposed therein in direct alignment both with the open front end of said control chamber and the orifice-defining front end of said control piston, and further communicating with the interior of said main, load-pressure chamber through the inherent space provided between the main, load-pressure chamber wall and the open front end of the control chamber resulting from the spaced relation therebetween; a drive chamber mounted to the said main, load-pressure chamber wall with a rear wall common thereto and its interior thereby being arranged in open communication with the centrally-disposed orifice thereof; a drive piston slidably adjustable within, and bearing-supported to the inside circumference of said drive chamber to a first, rearwardmost position with its rear piston-face being disposed in abutting, blocking and non-sealing relation against one side of the centrally-disposed orifice in preparation for the firing of said accelerator; a test vehicle drive element slidably mounted and adjustable in said drive chamber with the rear end thereof in operable engagement with the forward face of the said drive piston remote from said centrally-disposed orifice, and with its forward end extending outside of, and in bearing-supporting relation to the forward end of the drive chamber for operable association with a test vehicle to be accelerated; first, compressed fluid-supply means including a first and second fill valve for pressurizing both of the said control, and main, load-pressure chambers, at equal pressure and in consecutive sequence; said first fill valve being actuatable to initially introduce, fill and charge the said control chamber with compressed fluid at a predetermined pressure and directly through the forward chamber portion for impact against the closed rear end of, and thereby moving said control piston in slidable relation in said control chamber to its forward location relative thereto and thus urging its orifice-defining, open front end to a position enclosing said centrally-disposed orifice, and in contact with the main, load-pressure chamber-wall and further disposed in a sealed relation relative thereto, thereby blocking the upstream or rear side of said centrally-disposed orifice and its communication with the interior of the said main, load-pressure chamber; said second fill valve being immediately thereafter actuatable to subsequently introduce, fill and charge the said main, load-pressure chamber with compressed fluid at a requisite load pressure equal to and balancing the pressure in said contral chamber being exerted on said control piston to maintain its previously sealed condition relative to the centrally-disposed orifice, and in preparation for its subsequent action against the drive piston when the accelerator is to be fired; and second, quick-responsive, fluid pressure-relieving means in fluid communication with the rear portion of said control chamber behind the rear end of said control piston and operative to subsequently relieve the fluid pressure in the control chamber and thereby allow the now-higher pressure of the compressed fluid previously admitted into the main, load-pressure chamber to act in a rearward direction directly against the front end of and automatically move said control piston in said control chamber to its rear location therewithin; said movement of the control piston to its rear location in said control chamber being effective to unseal its orifice-defining, open front end from the centrally-disposed orifice to thereby open the previously-blocked communication between the interior of the main, load-pressure chamber and said orifice and thus enabling the load pressure of the pressurized fluid therein to act directly and instantaneously against the now exposed rear face of, and accelerate the drive piston, and the test vehicle-drive element and test vehicle operably associated therewith to the maximum velocity established for a particular test run.

2. In a pneumatic linear accelerator as in claim 1, wherein said compressed fluid comprises pressurized air supplied from a high pressure air source communicating respectively through separate fluid passage-means with said first and second fill valves comprising the said first, compressed fluid-supply means; and said second-named, quick-responsive, fluid pressure-relieving means comprises a fast acting valve communicating with said control chamber at a location therein behind said control piston for the subsequent controlled relief of the initially relatively high pressure therein acting thereagainst during the sealing operation thereof relative to the centrally-disposed orifice to thereby initiate the instantaneous firing of the accelerator.

3. In a pneumatic linear accelerator as in claim 2, and third, adjustable air volume control means in fluid communication with said main, load-pressure chamber for thereby regulating and varying the volume of compressed air available to, and from the said load pressure-chamber for producing the specific load pressure required to accelerate various test vehicles.

4. In a pneumatic linear accelerator as in claim 3, wherein said third, adjustable air volume control means comprises; a slidably-mounted barrier element positioned in transverse relation within, and dividing said main, load-pressure chamber into separate compressed air, and compressed liquid-chamber sections; a high pressure air source communicating with and delivering compressed air to said compressed air-chamber section; and a liquid source and pump means in communication with and delivering pressurized liquid to said compressed liquid-chamber section at a predetermined pressure forcing the slidable movement, in the said main, load-pressure chamber, of the said barrier element to a position of equilibrium between the respective pressures being exerted within the compressed air and liquid-chamber sections to thereby automatically adjust the space and thus air volume available in the said compressed air-chamber section.

5. In a pneumatic linear accelerator as in claim 4, wherein said slidably-mounted barrier element comprises a floating piston sealed between the walls of said main, load pressure-chamber and thereby ensuring the positive separation between the said compressed air, and liquid-chamber sections.

6. In a pneumatic linear accelerator as in claim 1, wherein said test vehicle-drive element comprises an elongated push rod in contact between one side of the drive piston and the test vehicle to be accelerated; and said drive piston incorporates on its other side an integral and elongated metering pin extending through the centrally-disposed orifice into the hollow interior of said control piston.

7. In a pneumatic linear accelerator as in claim 2, wherein said control piston mounts a face seal on its orifice end disposed in sealing relation relative to said centrally-disposed orifice; and said accelerator further comprises first, leakage control means in communication between said control and main load pressure chambers for automatically maintaining equal pressure therein in the event of any leakage of either the said face seal or fill and fast acting valves.

8. In a pneumatic linear accelerator as in claim 2, wherein said control piston mounts a face seal on its orifice end in sealing contact relative to the centrally-disposed orifice with the said drive chamber; and said drive piston incorporates a second, leakage control means comprising a relatively narrow passage extending therethrough from one side to the other and constituting a controlled leakage path automatically operative to relieve and thus prevent the build up of pressure on the centrally-disposed orifice side of said drive piston should a leak occur in the said control piston-face seal.

9. In a pneumatic linear accelerator as in claim 1, wherein said drive chamber incorporates air vents positioned adjacent or nearly adjacent its end nearest the test vehicle and positively providing a fast pressure relief to, and during the latter portion of the movement of the drive piston past the said air vents when the accelerator has been fired.

* * * * *